(12) United States Patent
Hecht

(10) Patent No.: US 9,079,252 B2
(45) Date of Patent: Jul. 14, 2015

(54) CUTTING TOOL WITH INDEXABLE CUTTING INSERT HAVING NON-ABUTTING SIDE FLANKS

(71) Applicant: Iscar, Ltd., Tefen (IL)

(72) Inventor: Gil Hecht, Nahariya (IL)

(73) Assignee: Iscar, Ltd., Tefen (IL)

(*) Notice: Subject to any disclaimer, the term of this patent is extended or adjusted under 35 U.S.C. 154(b) by 360 days.

(21) Appl. No.: 13/742,796

(22) Filed: Jan. 16, 2013

(65) Prior Publication Data

US 2014/0199128 A1 Jul. 17, 2014

(51) Int. Cl.
*B23B 27/16* (2006.01)
*B23B 27/04* (2006.01)
*B23B 29/04* (2006.01)
*B23B 27/22* (2006.01)

(52) U.S. Cl.
CPC ............ *B23B 27/1651* (2013.01); *B23B 27/04* (2013.01); *B23B 27/1611* (2013.01); *B23B 29/043* (2013.01); *B23B 2200/369* (2013.01); *B23B 2205/12* (2013.01); *Y10T 407/2272* (2015.01); *Y10T 407/2274* (2015.01); *Y10T 407/23* (2015.01)

(58) Field of Classification Search
CPC ............ B23B 27/007; B23B 27/1622; B23B 27/1614; B23B 29/043; B23B 2200/126; Y10T 407/23
See application file for complete search history.

(56) References Cited

U.S. PATENT DOCUMENTS

| 4,462,725 | A | 7/1984 | Satran et al. | |
|---|---|---|---|---|
| 4,890,961 | A * | 1/1990 | Carl et al. | 407/105 |
| 5,649,579 | A | 7/1997 | Kokko et al. | |
| 5,816,753 | A | 10/1998 | Hall | |
| 6,155,754 | A | 12/2000 | Jönsson | |
| 6,579,043 | B2 | 6/2003 | Erickson et al. | |
| 6,960,049 | B2 * | 11/2005 | Inayama | 407/103 |
| 7,001,115 | B2 * | 2/2006 | Erickson et al. | 407/113 |
| 7,094,006 | B2 * | 8/2006 | Hecht | 407/102 |
| 7,682,109 | B2 * | 3/2010 | Hecht et al. | 407/102 |
| 8,192,114 | B2 * | 6/2012 | Chang | 408/224 |
| 2010/0101390 | A1 | 4/2010 | Chiu | |
| 2011/0110733 | A1 * | 5/2011 | Hecht | 407/103 |

FOREIGN PATENT DOCUMENTS

| CH | 664102 A5 | 2/1988 |
|---|---|---|
| CH | 686935 | 8/1995 |

(Continued)

OTHER PUBLICATIONS

International Search Report dated May 9, 2014 issued in PCT counterpart application (No. PCT/IL2013/051056).

*Primary Examiner* — Will Fridie, Jr.
(74) *Attorney, Agent, or Firm* — Womble Carlyle

(57) ABSTRACT

A cutting tool has an S-shaped cutting insert retained in a corresponding insert pocket. The insert pocket has a longitudinal main axis extending in a forward to rearward direction. The cutting insert has a longitudinal first axis and a lateral second axis, with two opposite cutting portions and a clamping portion therebetween, arranged along the first axis. The insert pocket includes a forward clamping portion with a forward abutment surface, and a rear clamping portion with first and second rear abutment surfaces. Two side flanks of the cutting insert extend longitudinally oppositely, with first and second clamping surfaces located adjacent each side flank. The first and second clamping surfaces adjacent one side flank abut the first and second rear abutment surfaces, respectively. The first clamping surface adjacent the other side flank abuts the forward abutment surface. Neither of the side flanks abuts the tool holder.

21 Claims, 3 Drawing Sheets

(56) References Cited

FOREIGN PATENT DOCUMENTS

| CH | 661102 | 2/1998 |
| CN | 201768924 U | 3/2011 |
| EP | 02130762 | 3/1987 |
| EP | 1657012 | 5/2006 |
| JP | 110156605 | 6/1999 |
| JP | 20-07-203379 | 8/2007 |

* cited by examiner

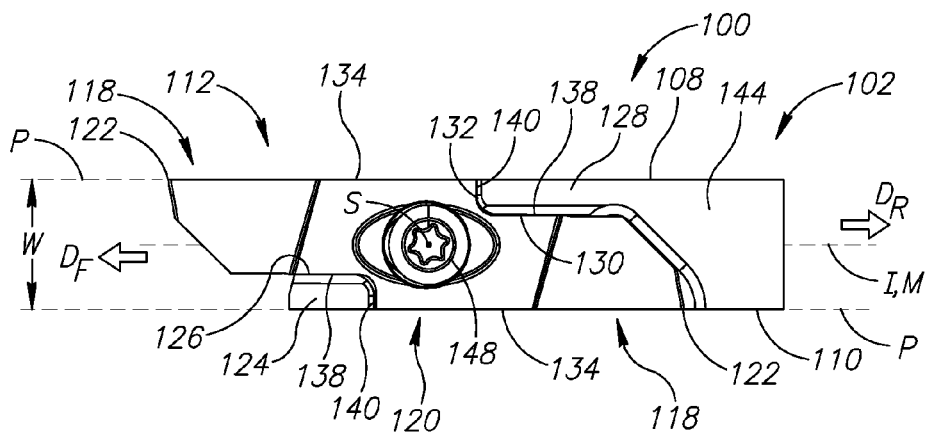
FIG.5
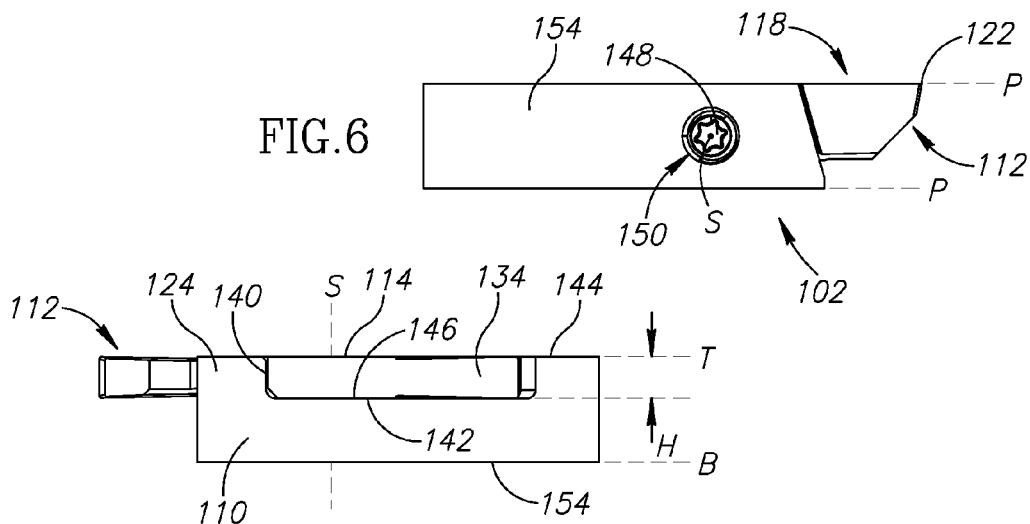
FIG.6
FIG.7
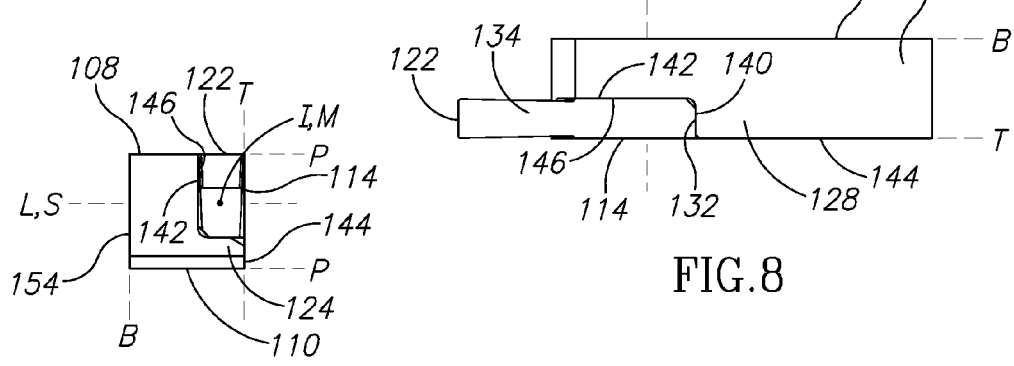
FIG.8
FIG.9

CUTTING TOOL WITH INDEXABLE CUTTING INSERT HAVING NON-ABUTTING SIDE FLANKS

FIELD OF THE INVENTION

The present invention relates to cutting tools with cutting inserts and matching insert pockets, in general, and to Swiss type cutting tools, in particular.

BACKGROUND OF THE INVENTION

Cutting tools have tool holders with formed pockets for retaining cutting inserts therein. The pockets may have a plurality of walls for the cutting insert to abut against, as well as a screw hole for receiving a screw which would fasten the cutting insert to the insert pocket. For example, in Swiss-type automatic machines, cutting tools have tool shanks that are typically made of rectangular shaped bars.

Cutting tools with formed insert pockets, and Swiss type cutting tools, are shown, for example, in CH664102, CH686935, JP11156605, EP0213076, EP1657012, U.S. Pat. No. 4,462,725, U.S. Pat. No. 4,890,961, U.S. Pat. No. 5,649,579, U.S. Pat. No. 5,816,753, U.S. Pat. No. 6,155,754, U.S. Pat. No. 6,579,043, U.S. Pat. No. 6,960,049, U.S. Pat. No. 7,001,115, US2010/0104390 and JP2007-203379.

It is an object of the subject matter of the present application to provide a cutting tool, having a cutting insert retained in a matching insert pocket, with the insert holder firmly retaining the cutting insert on both sides of the insert central axis, and the insert having non-abutting side flanks.

SUMMARY OF THE INVENTION

In accordance with the subject matter of the present application, there is provided a cutting tool comprising:
a tool holder comprising opposite first and second side surfaces, and an insert pocket having a longitudinal main axis extending in a forward to rearward direction and a lateral pocket axis; and
a cutting insert having a longitudinal first axis and a lateral second axis, and comprising two end surfaces and a peripheral surface therebetween, the cutting insert having two opposite cutting portions and a clamping portion therebetween, arranged along the first axis; wherein:
the insert pocket comprises:
  a forward clamping portion coupled with the second side surface, located forward of the pocket axis, and having a forward abutment surface; and
  a rear clamping portion coupled with the first side surface, located rearward of the pocket axis, and having first and second rear abutment surfaces;
two opposing side flanks of the cutting insert's peripheral surface extend in opposite directions along the cutting portions and partially along the clamping portion, and first and second clamping surfaces are located adjacent each side flank;
in an assembled position of the cutting tool the first and second clamping surfaces adjacent one side flank abut the first and second rear abutment surfaces, respectively, the first clamping surface adjacent the other side flank abuts the forward abutment surface, and neither of the side flanks abuts the tool holder.

In accordance with an embodiment of the subject matter of the present application, a pocket screw bore passes through the insert pocket along the pocket axis; and an insert screw bore passes through the clamping portion of the cutting insert along the second axis.

In accordance with another embodiment of the subject matter of the present application, a clamping screw passes through the insert screw bore and engages the pocket screw bore to fasten the cutting insert to the insert pocket.

In accordance with a further embodiment of the subject matter of the present application, in a top view of the cutting tool along the pocket axis, at least one of the side flanks of the cutting insert is flush with a respective one of the side surfaces of the tool holder.

In accordance with the subject matter of the present application, there is also provided a cutting insert having a longitudinal first axis and a lateral second axis around which the cutting insert has 180° rotational symmetry, the cutting insert comprising:
two end surfaces and a peripheral surface therebetween;
two opposite cutting portions and a clamping portion therebetween, arranged along the longitudinal first axis;
an insert screw bore passing through the clamping portion of the cutting insert along the lateral second axis;
the peripheral surface comprising:
two opposing side flanks extending in opposite directions along corresponding cutting portions and partially along the clamping portion, each side flank defining an insert side plane, the insert side planes of the two opposing side flanks defining therebetween an insert width; and
wherein:
each side flank has, adjacent thereto on a side opposite the corresponding cutting portion, first and second clamping surfaces which, in a top view of the cutting insert along the lateral second axis, are:
recessed from an adjacent insert side plane,
angled relative to one another and converge toward the lateral second axis; and
spaced apart from one another by a non-clamping insert surface.

BRIEF DESCRIPTION OF THE DRAWINGS

For a better understanding of the present invention and to show how the same may be carried out in practice, reference will now be made to the accompanying drawings, in which:

FIG. 5 is a top view of the cutting tool of FIG. 1;

FIG. 6 is a bottom view of the cutting tool of FIG. 1;

FIG. 7 is a side view of the cutting tool of FIG. 1;

FIG. 8 is another side view of the cutting tool of FIG. 1; and

FIG. 9 is a front view of the cutting tool of FIG. 1.

Figure 1:
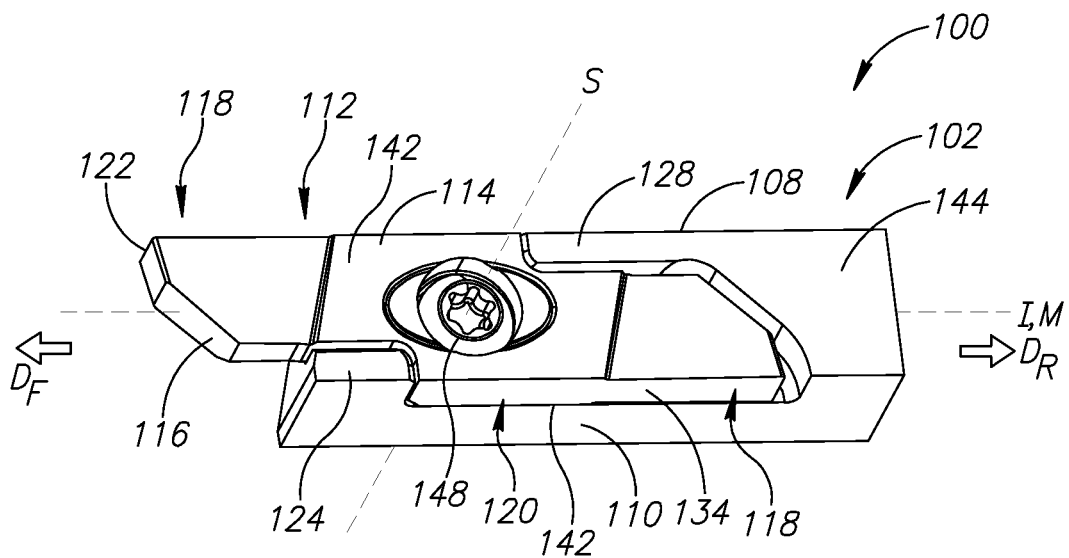
FIG. 1 is a perspective view of a cutting tool according to an embodiment of the disclosed technique, in an assembled position.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIGS. 1-9, depicting a cutting tool 100 in accordance with the present invention, in various views and positions. The cutting tool 100 comprises a tool holder 102 and a cutting insert 112. The tool holder 102 has an insert pocket 104 formed in a front end 106 thereof. The insert pocket 104 has a longitudinal main axis M extending in a forward to rearward direction $D_F$, $D_R$, and a lateral pocket axis S. The tool holder 102 has longitudinally extending opposite first and second side surfaces 108, 110, and top and bottom surfaces 144, 154 extending therebetween. The insert pocket 104 opens out to the top surface 144. The top surface 144 defines a top plane T. The top plane T may be substantially perpendicular to the side surfaces 108, 110. The bottom surface 154 is opposite of the top surface 144 and defines a bottom plane B. In some embodiments, the bottom plane B may be parallel to the top plane T (e.g., as depicted in the side views of FIGS. 7 and 8, taken perpendicular to the pocket axis S).

The insert pocket 104 has a forward clamping portion 124 and a rear clamping portion 128. The forward clamping portion 124 is coupled with the second side surface 110, located forward of the pocket axis S, and the rear clamping portion 128 is coupled with the first side surface 108, located rearwards of the pocket axis S. The forward clamping portion 124 has a longitudinally extending forward abutment surface 126. The rear clamping portion 128 has first and second rear abutment surfaces 130, 132, angled relative to one another and converging towards the pocket axis S. The first and second rear abutment surfaces 130, 132 may be spaced apart from one another by a non-abutting holder surface 131. The non-abutting holder surface 131 may be convex when viewed in a top view. Further, a threaded pocket screw bore 150 passes through the insert pocket 104 along the pocket axis S. The insert pocket 104 also has a pocket abutment surface 146. The pocket abutment surface 146 may be parallel to the top surface 144 of the tool holder 102, and spaced apart therefrom by a pocket height H (FIG. 7).

The first and second rear abutment surfaces 130, 132, and the forward abutment surface 126 may extend substantially perpendicular to the top plane T. The second rear abutment surface 132 may be substantially perpendicular to the first rear abutment surface 130, for example, as depicted in the top view of FIG. 5. As further depicted in FIG. 5, the forward abutment surface 126 may extend substantially parallel to the second side surface 110. Similarly, the first rear abutment surface 130 may extend substantially parallel to the first side surface 108. Additionally, the forward abutment surface 126 may extend substantially parallel to the first rear abutment surface 130.

The cutting insert 112 is S-shaped, having a longitudinal first axis I and a lateral second axis L. The cutting insert 112 may be indexable, exhibiting 180° rotational symmetry about the second axis L. The cutting insert 112 has two end surfaces 114 and a peripheral surface 116 extending therebetween. Two opposite cutting portions 118 are formed along the cutting insert 112, and a central clamping portion 120 is located therebetween, arranged along the first axis I. Each cutting portion 118 has a cutting edge 122. Further, an insert screw bore 152 passes through the clamping portion 120 along the second axis L. The clamping portion 120 of the cutting insert 112 has an insert abutment surface 142, located on one of the end surfaces 114.

The peripheral surface 116 of the cutting insert 112 has two opposing side flanks 134, each side flank 134 defining an insert side plane P, located on opposite sides of the second axis L. The insert side planes P are parallel to one another and are spaced apart by an insert width W (FIG. 5). Thus, the insert width defined by the side flanks 134 extends in a direction perpendicular to an imaginary plane defined by the longitudinal first axis I and the lateral second axis L. The two opposing side flanks 134 extend in opposite directions along their associated cutting portions 118, from the cutting edges 122, and partially along the clamping portion 120. In an end view of the cutting insert 112, taken along the second axis L (see FIG. 5), the side flanks 134 extend longitudinally from the cutting edges 122, in opposite ones of the forward direction $D_F$ and the rearward direction $D_R$. A recessed clamping corner 136 is located following each side flanks 134, i.e., in a direction away from the respective cutting edge 122. Each clamping corner 136 has first and second clamping surfaces 138, 140 (located adjacent the respective side flank 134), which are angled relative to one another and converge towards the second axis L. The first and second clamping surfaces 138, 140 may be spaced apart from one another by a non-clamping insert surface 139. The non-clamping insert surface 139 may be concave (i.e., in a top view), forming the closest point of approach on the peripheral surface 116 to the second insert axis L around which the cutting insert has 180° rotational symmetry.

Figure 2:
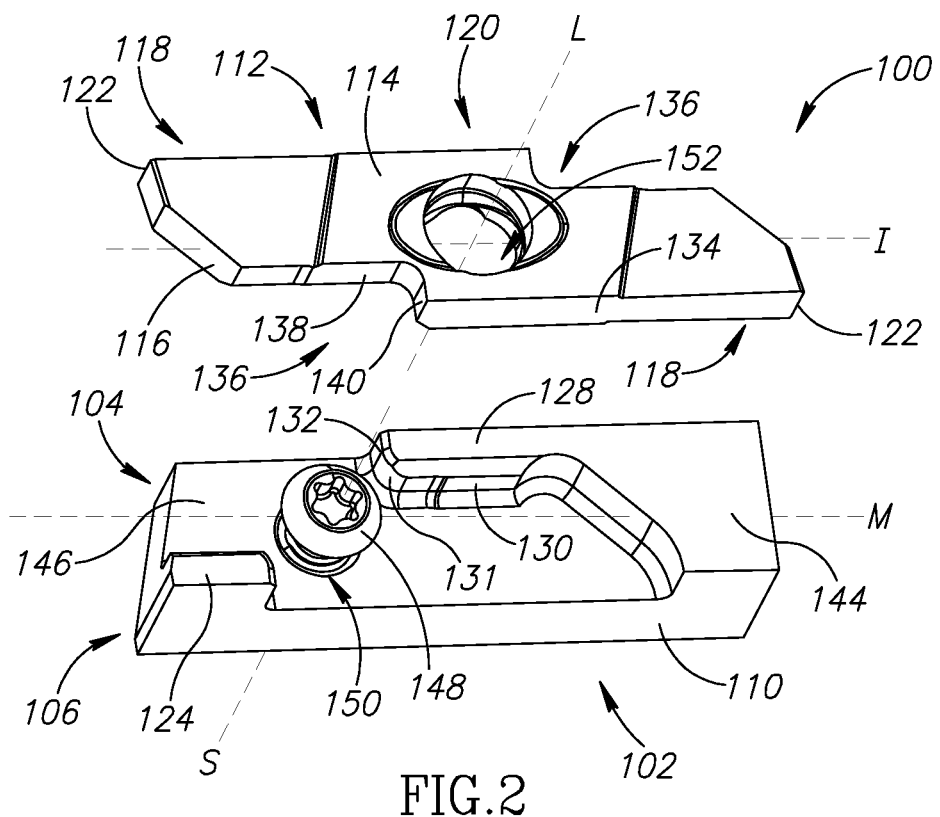
FIG. 2 is a perspective view of the cutting tool of FIG. 1, in a disassembled position.
Figure 3:
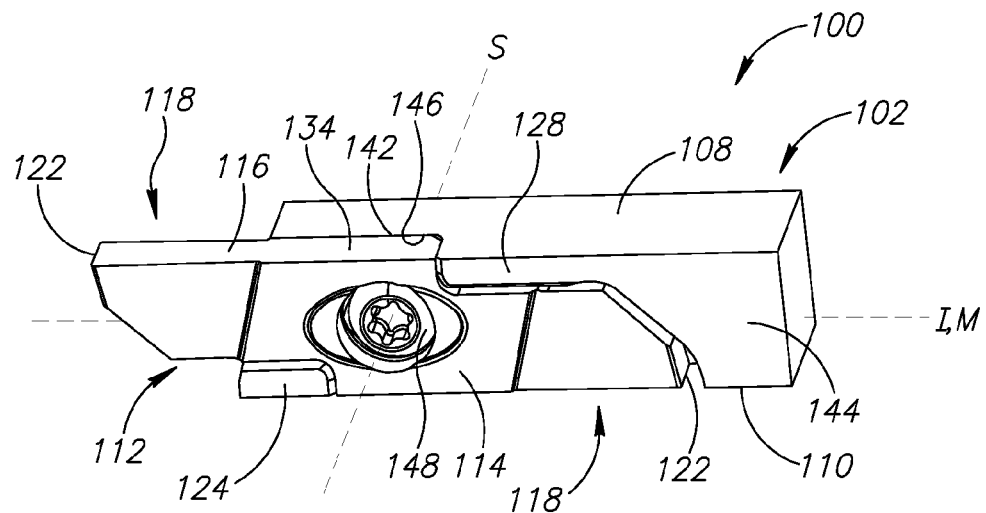
FIG. 3 is another perspective view of the cutting tool of FIG. 1, in the assembled position.
Figure 4:
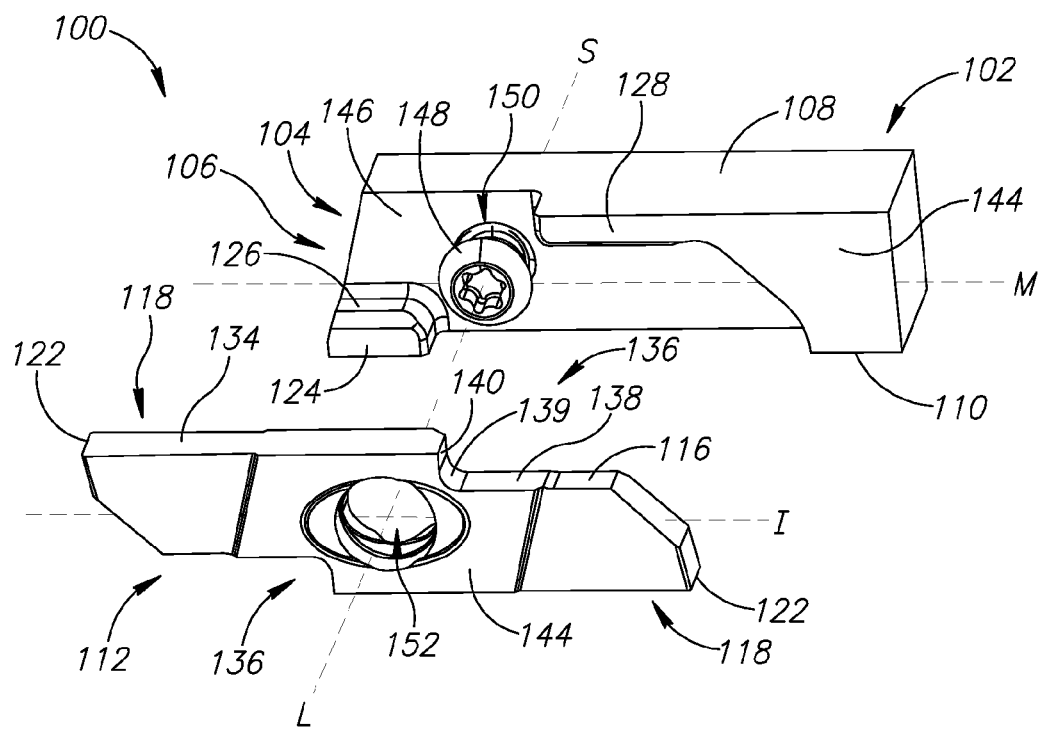
FIG. 4 is a perspective view of the cutting tool of FIG. 3, in the disassembled position.

The cutting tool 100 is moveable between an assembled position (e.g., FIGS. 1 and 3) and a disassembled position (e.g., FIGS. 2 and 4). In the disassembled position, the cutting insert 112 is separated from the tool holder 102. In the assembled position, the cutting insert 112 is retained in the insert pocket 104, for example with a clamping screw 148. The clamping screw 148 passes through the insert screw bore 152 along the pocket axis S and threadingly engages the pocket screw bore 150 to fasten the cutting insert 112 to the insert pocket 104. The pocket axis S may pass slightly rearwards of the cutting insert's second axis L, i.e., along the main axis M, in order to retain the cutting insert 112 with a rearward tightening.

In the assembled position, the first and second clamping surfaces 138, 140 of one of the clamping corners 136 (i.e., adjacent one of the side flanks 134 and recessed from the insert side plane P), abut the first and second rear abutment surfaces 130, 132, respectively. The first clamping surface 138 of the other clamping corner 136 (i.e., adjacent the other side flank 134), abuts the forward abutment surface 126 of the forward clamping portion 124. The insert abutment surface 142 abuts the pocket abutment surface 146. Notably, in the assembled position, neither of the side flanks 134 of the cutting insert 112 abuts the tool holder 102, and hence both side flanks 134 are considered non-abutting side flanks 134.

Both of the second clamping surfaces 140 are located longitudinally between the first clamping surfaces 138. This provides further stability in retaining the cutting insert 112, when the two first clamping surfaces 138 are abutted against the insert pocket 104, and the angled second clamping surface 140 is located longitudinally therebetween.

The second clamping surface 140 of the clamping corner 136 which is close to the forward clamping portion 124, does not contact the forward clamping portion 124 (FIG. 7). In this manner, the cutting insert 112 is clamped in three locations about the second axis L against the insert pocket 104, namely, in the forward abutment surface 126, and the first and second rear abutment surfaces 138, 140. For this matter, both of the side flanks 134 of the cutting insert 112 may remain free from abutting the tool holder 102, as it is not required to obtain another location of abutment between the cutting insert 112 and the insert pocket 104.

The abutment locations of the cutting insert 112 are spaced apart from its cutting edges 122. Thus, any force or pressure applied at the abutment locations due to clamping or cutting operations, does not affect the cutting edges 122. The cutting edges 122 are not subject to forces originating in the clamping of the cutting insert 112, and are less prone to breakage due to such forces, thereby increasing the durability of the cutting insert 112. Further, if one of the cutting edges 122 is damaged during cutting operations (e.g., cracked or broken), the cutting insert 112 may still be indexed and clamped in the insert pocket 104, and the other cutting edge 122 may be further employed in cutting operations.

In the assembled position, the cutting portion 118 which is close to the forward clamping portion 124, extends forward of the tool holder 102. This is apparent, for example, in a bottom view of the assembled cutting tool 100, taken along the pocket axis S, as depicted in FIG. 6. Additionally, the first axis I of the cutting insert 112 may coincide with the main axis M of the tool holder 102. This is apparent, for example, in the top view of FIG. 5, and the front view of FIG. 9 (taken along the main axis M).

When the assembled cutting tool 100 is viewed in a top view along the pocket axis S (see FIG. 5), at least one of the side flanks 134 of the cutting insert 112 is flush with a respective one of the side surfaces 108, 110 of the tool holder 102. This may be required when employing the invention in machines with limited space or multiple shanks placed in proximity to one another, which may also limit the access to the cutting tool 100. In the drawings of the present application, and in particular in the top view of FIG. 5, both of the side flanks 134 are flush with both of the side surfaces 108, 110 of the tool holder 102. However, it may be that only one of the side flanks 134 will be flush with the respective one of the side surfaces 108, 110.

In order to retain the cutting insert 112 in the insert pocket 104, or to remove the cutting insert 112 therefrom, the clamping screw 148 is fastened to, or loosened from the pocket screw bore 150, respectively. However, according to an embodiment of the present invention, the clamping screw 148 may not have to be completely extracted from the pocket screw bore 150, for the cutting insert 112 to be mounted into the insert pocket 104, or removed therefrom. Instead, it may be required to partially loosen the clamping screw 148, while keeping it threadingly engaged with the pocket screw bore 150 to a certain extent (e.g., FIGS. 2 and 4). In such an embodiment, the insert screw bore 152 is designed to allow the cutting insert 112 to pass over the head of the clamping screw 148 in particular orientations. This may be achieved, for example, when the insert screw bore 152 has a varying cross section along the second axis L, which allows it to pass over the head of the clamping screw 148, for example, when rotating the cutting insert 112 about the first axis I. Moreover, since neither of the side flanks 134 abut the tool holder 102, it is possible to rotate the cutting insert 112 about the first axis I. If either one of the side flanks 134 were abutted against the tool holder 102, it would have prevented such rotation of the cutting insert 112 about the first axis I, and thus prevent usage of such insert removal over the fastening screw head.

The cutting tool 100 shown in the accompanying drawings is a Swiss type cutting tool, with the tool holder 102 having a rectangular lateral cross section, as depicted in the front view of FIG. 9, taken along the longitudinal main axis M. However, it should be understood that the invention is in no way whatsoever restricted to the cutting tools of the type used for Swiss-type automatic machines (e.g., lathes), but is applicable to many types of cutting tools wherein a cutting insert is to be secured to an insert pocket. For example, the cutting tool 100 may be a different kind of cutting tool, with the tool holder 102 having a non-rectangular cross section, while still employing the features of the cutting insert and insert pocket according to the present invention.

It would be appreciated that the abutment locations of the cutting insert 112 are on the peripheral surface 116 thereof, except for the insert abutment surface 142. Thus, there is no need to form any abutment or clamping structures, such as protrusions or depressions, on the insert end surfaces 114, and correspondingly on the pocket abutment surface 146. In other words, the height of the cutting insert 112 in the clamping portion 120 (i.e., the lateral distance between the end surfaces 114), is substantially constant. In this manner, the manufacture of the cutting insert 112 is simplified, for example, when the cutting insert 112 is formed by pressing of cemented carbide (e.g., tungsten carbide), and subsequent sintering thereof. For example, the manufacture of the cutting insert 112 is made easier by simplifying the mold in which the cutting insert 112 is press-formed.

It should further be appreciated, that as the side flanks 134 of the cutting insert 112 are free of abutment or clamping, there is no need to form any abutment structures or clamping surfaces on the tool holder 102 adjacent the side flanks 134. This allows the insert width W to be made substantially similar to the width of the tool holder 102, namely the distance between the side surfaces 108, 110. If either one of the side flanks 134 were abutted against the tool holder 102, it would mean that the insert width W is smaller than the width of the tool holder 102.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool (100) comprising:
a tool holder (102) comprising opposite first and second side surfaces (108, 110), and an insert pocket (104) having a longitudinal main axis (M) extending in a forward to rearward direction ($D_F$, $D_R$) and a lateral pocket axis (S); and
a cutting insert (112) having a longitudinal first axis (I) and a lateral second axis (L), and comprising two end surfaces (114) and a peripheral surface (116) therebetween, the cutting insert (112) having two opposite cutting portions (118) and a clamping portion (120) therebetween, arranged along the first axis (I); wherein:
the insert pocket (104) comprises:
a forward clamping portion (124) coupled with the second side surface (110), located forward of the pocket axis (S), and having a forward abutment surface (126); and a rear clamping portion (128) coupled with the first side surface (108), located rearward of the pocket axis (S), and having first and second rear abutment surfaces (130, 132);

two opposing side flanks (134) of the cutting insert peripheral surface (116) extend in opposite directions along corresponding cutting portions (118) and partially along the clamping portion (120), with first and second clamping surfaces (138, 140) located adjacent each side flank (134);

in an assembled position of the cutting tool (100) the first and second clamping surfaces (138, 140) adjacent one side flank (134) abut the first and second rear abutment surfaces (130, 132), respectively, the first clamping surface (138) adjacent the other side flank (134) abuts the forward abutment surface (126), and neither of the side flanks (134) abuts the tool holder (102).

2. The cutting tool (100) according to claim 1, wherein the cutting insert (112) has 180° rotational symmetry about the second axis (L), and each cutting portion (118) has a cutting edge (122).

3. The cutting tool (100) according to claim 1, wherein the second clamping surface (140) adjacent the side flank (134) by the forward clamping portion (124) does not abut the tool holder (102).

4. The cutting tool (100) according to claim 1, wherein each first clamping surface (138) is angled relative to the respective second clamping surface (140), forming a clamping corner (136) converging towards the second axis (L).

5. The cutting tool (100) according to claim 1, wherein first and second rear abutment surfaces (130, 132) are angled relative to one another.

6. The cutting tool (100) according to claim 5, wherein first and second rear abutment surfaces (130, 132) are substantially perpendicular relative to one another.

7. The cutting tool (100) according to claim 1, wherein:
the clamping portion (120) of the cutting insert (112) has an insert abutment surface (142), located on one of the end surfaces (114);
the tool holder (102) has a top surface (144) extending between the first and second side surfaces (108, 110) and defining a top plane (T);
the insert pocket (104) has a pocket abutment surface (146) parallel to the top surface (144), and spaced apart therefrom by a pocket height (H); and
the insert abutment surface (142) abuts the pocket abutment surface (146).

8. The cutting tool (100) according to claim 7, wherein the top plane (T) is substantially perpendicular to the side surfaces (108, 110).

9. The cutting tool (100) according to claim 7, wherein the first and second rear abutment surfaces (130, 132) and the forward abutment surface (126) extend substantially perpendicularly to the top plane (T).

10. The cutting tool (100) according to claim 1, wherein:
a pocket screw bore (150) passes through the insert pocket (104) along the pocket axis (S); and
an insert screw bore (152) passes through the clamping portion (120) of the cutting insert (112) along the second axis (L).

11. The cutting tool (100) according to claim 10, wherein a clamping screw (148) passes through the insert screw bore (152) and engages the pocket screw bore (150) to fasten the cutting insert (112) to the insert pocket (104).

12. The cutting tool (100) according to claim 1, wherein in a top view of the cutting tool (100) along the pocket axis (S), at least one of the side flanks (134) of the cutting insert (112) is flush with a respective one of the side surfaces (108, 110) of the tool holder (102).

13. The cutting tool (100) according to claim 1, wherein the second rear abutment surface (132) is substantially perpendicular to the first rear abutment surface (130).

14. The cutting tool (100) according to claim 1, wherein each side flank (134) of the cutting insert (112) defines a side plane (P), the side planes (P) being parallel to one another and spaced apart by an insert width (W).

15. The cutting tool (100) according to claim 1, wherein the forward abutment surface (126) extends substantially parallel to the second side surface (110).

16. The cutting tool (100) according to claim 1, wherein the first rear abutment surface (130) extends substantially parallel to the first side surface (108).

17. The cutting tool (100) according to claim 1, wherein the tool holder (102) has a bottom surface (154) extending between the first and second side surfaces (108, 110), opposite of the top surface (144) and defining a bottom plane (B).

18. The cutting tool (100) according to claim 17, wherein the bottom plane (B) is parallel to the top plane (T).

19. The cutting tool (100) according to claim 17, wherein:
the first and second rear abutment surfaces (130, 132) are spaced apart from one another by a non-abutting holder surface (131); and
the first and second clamping surfaces (138, 140) are spaced apart from one another by a non-clamping insert surface (139).

20. A cutting insert (112) having a longitudinal first axis (I) and a lateral second axis (L) around which the cutting insert has 180° rotational symmetry, the cutting insert (112) comprising:
two end surfaces (114) and a peripheral surface (116) therebetween;
two opposite cutting portions (118) and a clamping portion (120) therebetween, arranged along the longitudinal first axis (I);
an insert screw bore (152) passing through the clamping portion (120) of the cutting insert (112) along the lateral second axis (L);
the peripheral surface (116) comprising:
two opposing side flanks (134) extending in opposite directions along corresponding cutting portions (118) and partially along the clamping portion (120), each side flank (134) defining an insert side plane (P), the insert side planes (P) of the two opposing side flanks defining therebetween an insert width (W); and
wherein:
each side flank (134) has, adjacent thereto on a side opposite the corresponding cutting portion (118), first and second clamping surfaces (138, 140) which, in a top view of the cutting insert (112) along the lateral second axis (L), are:
recessed from an adjacent insert side plane (P),
angled relative to one another and converge toward the lateral second axis (L); and
spaced apart from one another by a non-clamping insert surface (139).

21. The cutting insert (112) according to claim 20, wherein the non-clamping insert surfaces (139) form the closest point of approach on the peripheral surface (116) to the lateral second axis (L) around which the cutting insert has 180° rotational symmetry.

* * * * *